(12) United States Patent
Lacroix et al.

(10) Patent No.: US 6,525,134 B1
(45) Date of Patent: Feb. 25, 2003

(54) ANTISTATIC ACRYLIC POLYMER COMPOSITIONS

(75) Inventors: Christophe Lacroix, Harquency (FR); Gilles Meunier, Mazerolles (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/831,339

(22) PCT Filed: Sep. 6, 2000

(86) PCT No.: PCT/FR00/02453

§ 371 (c)(1),
(2), (4) Date: Jul. 20, 2001

(87) PCT Pub. No.: WO01/18111

PCT Pub. Date: Mar. 15, 2001

(30) Foreign Application Priority Data

Sep. 9, 1999 (FR) .............................................. 99 11281
Sep. 20, 1999 (FR) .............................................. 99 11744

(51) Int. Cl.⁷ ................................................ G08L 77/12
(52) U.S. Cl. ....................................... 525/66; 525/92 A
(58) Field of Search ................................. 525/66, 92 A

(56) References Cited

U.S. PATENT DOCUMENTS 5,574,101 A * 11/1996 Kawakami et al. ....... 525/92 A

FOREIGN PATENT DOCUMENTS

| JP | 01308444 A | * | 12/1989 |
| JP | 08085729 A | * | 4/1996 |
| JP | 10139974 A | * | 5/1998 |

* cited by examiner

*Primary Examiner*—Ana Woodward
(74) *Attorney, Agent, or Firm*—Millen, White, Zelano & Branigan, P.C.

(57) ABSTRACT

The present invention relates to an antistatic composition having improved impact strength behaviour, comprising, per 100 parts by weight:

95 to 80 parts of (A)+(C), 5 to 20 parts of (B), (A) being an acrylic polymer, (B) being a copolymer containing polyamide blocks and polyether blocks essentially comprising ethylene oxide —$(C_2H_4$—O)— units, (C) being a polymer chosen from acrylic impact modifiers, low-mass copolymers (C1) of styrene and of an unsaturated carboxylic anhydride, copolymers (C2) of ethylene and of an unsaturated carboxylic anhydride, copolymers (C3) of ethylene and of an unsaturated epoxide, or mixtures thereof.

12 Claims, No Drawings

ANTISTATIC ACRYLIC POLYMER COMPOSITIONS

FIELD OF THE INVENTION

The present invention relates to antistatic acrylic polymers, and more specifically to a composition comprising an acrylic polymer (A), a copolymer (B) containing polyamide blocks and polyether blocks essentially comprising ethylene oxide —$(C_2H_4$—O)— units, and a polymer (C) chosen from acrylic impact modifiers and/or functional polymers.

It is concerned with giving the acrylic polymer (A) antistatic properties. The formation and retention of static electricity charges at the surface of most plastics are known. The presence of static electricity on thermoplastic films leads, for example, to these films sticking together, making them difficult to separate. The presence of static electricity on wrapping films can cause the accumulation of dust on the objects to be wrapped and thus inhibit their use. Acrylic resins such as, for example, PMMA are used to make different objects, and in particular transparent objects. Static electricity causes the accumulation of dust at the surface of these objects, which is an inconvenience as regards the transparency.

The prior art discloses antistatic agents such as ionic surfactants of the sulphonate or ethoxylated amine type which are added to polymers. However, the antistatic properties of the polymers depend on the ambient humidity and they are not permanent since these agents migrate to the surface of the polymers and disappear. Polymers containing polyamide blocks and hydrophilic polyether blocks have thus been proposed as antistatic agents, these agents having the advantage of not migrating and thus of giving permanent antistatic properties that are more independent of the ambient humidity.

The aim of the present invention is to give a permanently antistatic nature to commercially available acrylic resins, i.e. (i) resins consisting essentially only of acrylic polymer or (ii) resins consisting of a mixture of acrylic polymer and of an impact modifier. Another aim of the invention is also to improve the impact behaviour, in particular the multiaxial impact behaviour. As regards transparent PMMA, the aim is also not to adversely affect the transparency.

PRIOR ART

Japanese patent application JP 60 023 435 A published on Feb. 6, 1985 discloses antistatic combinations comprising 5 to 80% of polyether-esteramide and 95 to 20% of a thermoplastic resin chosen, inter alia, from polystyrene, ABS and PMMA, this resin being functionalized with acrylic acid or maleic anhydride. Examples show compositions consisting of 60 to 70 parts of carboxylated PMMA and 40 to 30 parts of polyetheresteramide (per 100 parts). Others show compositions consisting of 30 to 45 parts of carboxylated PMMA, 40 to 25 parts of PMMA and 30 parts of polyetheresteramide (per 100 parts). Nothing is written regarding the transparency of PMMA-based compositions and, what is more, it is necessary to have available carboxylated PMMA in large proportions.

Japanese patent application JP 03 237 149 A published on Oct. 23, 1991 discloses antistatic compositions consisting of 40 to 99% of an acrylic resin, 1 to 60% of polyetheresteramide and 0.2 to 15% of a grafted polymer containing maleic anhydride or epoxide functions and a portion which is soluble in the acrylic resin. The grafted polymer is complicated to prepare.

Japanese patent applications JP 08 253640 A published on Oct. 1, 1996 and JP 04 146 947 A published on May 20, 1992, disclose antistatic and transparent compositions consisting of acrylic resin, polyetheresteramide and salts. It is not desirable to add salts to such compositions since they may later migrate when the compositions are used.

Japanese patent applications JP 05 295 213 A published on Nov. 9, 1993 and JP 05 287 157 A published on Nov. 2, 1993 disclose antistatic and transparent compositions consisting of acrylic resin, polyetheresteramide and optionally an electrolyte or sulphonic acid. They have the same drawback as the above compositions.

Japanese patent applications JP 05 078 543 A and JP 04 146 947 A disclose antistatic and transparent compositions consisting of acrylic resin and polyetheresteramide. The mechanical properties of the base resin are greatly impaired.

BRIEF DESCRIPTION OF THE INVENTION

Novel antistatic acrylic resin compositions have now been found. To give a permanently antistatic nature to commercially available acrylic resins, i.e. (i) resins consisting essentially only of acrylic polymer or (ii) resins consisting of a mixture of acrylic polymer and of an impact modifier, it suffices to add thereto a polyetheresteramide and optionally certain functional polymers. Another advantage of the invention is also to improve the impact properties, in particular the multiaxial impact properties. As regards transparent PMMA, the advantage is also not to adversely affect the transparency.

The present invention thus relates to an antistatic composition having improved impact strength behaviour, comprising, per 100 parts by weight:

95 to 80 parts of (A)+(C), 5 to 20 parts of (B), (A) being an acrylic polymer, (B) being a copolymer containing polyamide blocks and polyether blocks essentially comprising ethylene oxide —$(C_2H_4$—O)— units, (C) being a polymer chosen from acrylic impact modifiers, low-mass copolymers (C1) of styrene and of an unsaturated carboxylic anhydride, copolymers (C2) of ethylene and of an unsaturated carboxylic anhydride, copolymers (C3) of ethylene and of an unsaturated epoxide, or mixtures thereof.

The Applicant has discovered that the invention is particularly useful for impact-modified PMMA, i.e. a mixture of (A) and of an acrylic impact modifier (C). To give this composition an antistatic nature without it being necessary to add one or more of the copolymers (C1) to (C3), it suffices to add (B) thereto. Furthermore, the transparency is not substantially adversely affected. Another advantage is that the mixture of the impact-modified PMMA and of (B) can be prepared by dry blending and introduced directly into the injection or moulding device without it being necessary to prepare an intimate mixture in an extruder or blender.

DETAILED DESCRIPTION OF THE INVENTION

Examples of acrylic polymers (A) which may be mentioned are alkyl (meth)acrylate homopolymers. Alkyl (meth)acrylates are described in Kirk-Othmer, Encyclopedia of chemical technology, 4th edition, in Vol. 1, pages 292–293 and in Vol. 16, pages 475–478. Mention may also be made of copolymers of at least two of these (meth)acrylates and copolymers of at least one (meth)acrylate with at least one monomer chosen from acrylonitrile, butadiene, styrene and isoprene, provided that the proportion of (meth)acrylate is at least 50 mol %. The invention is particularly useful for PMMA. These acrylic polymers either consist of monomers and optionally of the comonomers mentioned above and contain no impact modifier, or they additionally contain an acrylic impact modifier. The acrylic impact modifiers are, for example, random or block copolymers of at least one monomer chosen from styrene, butadiene and isoprene and of at least one monomer chosen from acrylonitrile and alkyl (meth)acrylates, and they may be of core-shell type. These acrylic impact modifiers can be mixed with the acrylic polymer (A) once prepared or can be introduced during the polymerization of (A) or prepared simultaneously during the polymerization of (A). The melt flow index of (A) may be between 2 g/10 min and 15 g/10 min measured at 230° C. under a load of 3.8 kg.

The amount of acrylic impact modifier may be, for example, from 0 to 30 parts per 100 to 70 parts of (A) and advantageously from 5 to 20 parts per 95 to 20 parts of (A).

It would not constitute a departure from the invention if (A) was a mixture of two or more of the above polymers.

The polymers (B) containing polyamide blocks and polyether blocks result from the copolycondensation of polyamide sequences containing reactive ends with polyether sequences containing reactive ends, such as, inter alia:

1) polyamide sequences containing diamine chain ends with polyoxyalkylene sequences containing dicarboxylic chain ends,
2) polyamide sequences containing dicarboxylic chain ends with polyoxyalkylene sequences containing diamine chain ends, obtained by cyanoethylation and hydrogenation of aliphatic α,ω-dihydroxylated polyoxyalkylene sequences, known as polyetherdiols, 3) polyamide sequences containing dicarboxylic chain ends with polyetherdiols, the products obtained being, in this specific case, polyetheresteramides. The copolymers (B) are advantageously of this type.

The polyamide sequences with dicarboxylic chain ends are obtained, for example, from the condensation of α,ω-aminocarboxylic acids, lactams or dicarboxylic acids and diamines in the presence of a chain-limiting dicarboxylic acid.

The number-average molar mass $\overline{M}_n$ of the polyamide sequences is between 300 and 15000 and preferably between 600 and 5000. The mass of the polyether sequences is between 100 and 6000 and preferably between 200 and 3000.

The polymers containing polyamide blocks and polyether blocks can also comprise randomly-distributed units. These polymers can be prepared by simultaneously reacting the polyether and precursors of the polyamide blocks.

For example, polyetherdiol, a lactam (or an α,ω-amino acid) and a chain-limiting diacid can be reacted in the presence of a small amount of water. A polymer essentially containing polyether blocks, polyamide blocks of very variable length, and also the various reagents which have reacted randomly and which are distributed randomly along the polymer chain, is obtained.

These polymers containing polyamide blocks and polyether blocks, whether they are obtained from the copolycondensation of polyamide and polyether sequences prepared beforehand or from a one-step reaction, have, for example, shore D hardnesses which may be between 20 and 75 and advantageously between 30 and 70, and an intrinsic viscosity of between 0.8 and 2.5, measured in meta-cresol at 250° C. for an initial concentration of 0.8 g/100 ml. The MFI values may be between 5 and 50 (235° C. under a 1 kg load).

The polyetherdiol blocks are either used as they are and copolycondensed with polyamide blocks containing carboxylic ends, or they are aminated in order to be converted into polyetherdiamines and condensed with polyamide blocks containing carboxylic ends. They can also be mixed with polyamide precursors and a chain limiter in order to prepare polymers containing polyamide blocks and polyether blocks having randomly distributed units.

Polymers containing polyamide and polyether blocks are described in patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

According to a first form of the invention, the polyamide sequences containing dicarboxylic chain ends are obtained, for example, from the condensation of α,ω-aminocarboxylic acids, lactams or dicarboxylic acids and diamines in the presence of a chain-limiting dicarboxylic acid. An example of an α,ω-aminocarboxylic acid which may be mentioned is aminoundecanoic acid, examples of lactams which may be mentioned are caprolactam and lauryllactam, examples of dicarboxylic acids which may be mentioned are adipic acid, decanedioic acid and dodecanedioic acid, and an example of a diamine which may be mentioned is hexamethylenediamine. The polyamide blocks are made of nylon-12 or nylon-6. The melting point of these polyamide sequences, which is also that of the copolymer (B), is generally 10 to 15° C. below that of the PA-12 or PA-6.

Depending on the nature of (A), it may be useful to use a copolymer (B) which has a lower melting point so as not to degrade (A) during the incorporation of (B), and this forms the subject of the second and third forms of the invention below.

According to a second form of the invention, the polyamide sequences result from the condensation of one or more α,ω-aminocarboxylic acids and/or of one or more lactams containing from 6 to 12 carbon atoms in the presence of a dicarboxylic acid containing from 4 to 12 carbon atoms and of low molecular mass, i.e. $\overline{M}n$ of 400 to 1000. Examples of α,ω-aminocarboxylic acid which may be mentioned are aminoundecanoic acid and aminododecanoic acid. Examples of dicarboxylic acids which may be mentioned are adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

Examples of lactams which may be mentioned are caprolactam and lauryllactam.

Caprolactam will be avoided, unless the polyamide is purified of the caprolactam monomer which remains dissolved therein.

Polyamide sequences obtained by condensing lauryllactam in the presence of adipic acid or dodecanedioic acid and with a mass $\overline{M}n$ 750 have a melting point of 127–130° C.

According to a third form of the invention, the polyamide sequences result from the condensation of at least one α,ω-aminocarboxylic acid (or a lactam), at least one diamine and at least one dicarboxylic acid. The α,ω-aminocarboxylic acid, the lactam and the dicarboxylic acid can be chosen from those mentioned above.

The diamine can be an aliphatic diamine containing from 6 to 12 atoms, and may be an arylic and/or saturated cyclic diamine.

Examples which may be mentioned are hexamethylenediamine, piperazine, 1-aminoethylpiperazine, bisaminopropylpiperazine, tetramethylene-diamine, octamethylenediamine, decamethylenediamine, dodecamethylene-diamine, 1,5 diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)-methane (BMACM).

In the second and third forms of the invention, the various constituents of the polyamide sequence and their proportion are chosen so as to obtain a melting point of less than 150° C. and advantageously between 90 and 135° C. Low-melting copolyamides are described in patents U.S. Pat. No. 4,483, 975, DE 3 730 504 and U.S. Pat. No. 5,459,230, and the same proportions of the constituents are used for the polyamide blocks of (B). (B) can also be the copolymers described in U.S. Pat. No. 5,489,667.

The polyether blocks can represent 5 to 85% by weight of (B). The polyether blocks can contain units other than the ethylene oxide units, such as, for example, propylene oxide and polytetrahydrofuran (which leads to polytetramethylene glycol linkages). It is also possible, for example, to simultaneously use PEG blocks, i.e. blocks consisting of ethylene oxide units, PPG blocks, i.e. blocks consisting of propylene oxide units, and PTMG blocks, i.e. blocks consisting of tetramethylene glycol units, also known as polytetrahydrofuran units. PEG blocks or blocks obtained by oxyethylation of bisphenols such as, for example, bisphenol A are advantageously used. The latter products are described in patent EP 613 919. The amount of polyether blocks in (B) is advantageously from 10 to 50% and preferably from 35 to 50% by weight of (B).

The copolymers of the invention can be prepared by any means for attaching the polyamide blocks and polyether blocks. In practice, essentially two processes are used, one referred to a two-step process, the other a one-step process.

The 2-step process consists first in preparing the polyamide blocks containing carboxylic ends by condensation of the polyamide precursors in the presence of a chain-limiting dicarboxylic acid, and then, in a second step, in adding the polyether and a catalyst. If the polyamide precursors are only lactams or α,ω-aminocarboxylic acids, a dicarboxylic acid is added. If the precursors already comprise a dicarboxylic acid, it is used in excess relative to the stoichiometry of the diamines. The reaction usually takes place between 180 and 300° C., preferably 200 to 260° C., with the pressure in the reactor established between 5 and 30 bar, and this is maintained for about 2 hours. The pressure is reduced slowly by opening the reactor to the atmosphere, and the excess water is then distilled off, for example one or two hours.

Once the polyamide containing carboxylic acid ends has been prepared, the polyether and a catalyst are then added. The polyether can be added in one or more portions, as can the catalyst. According to one advantageous form, the polyether is first added, and the reaction of the OH ends of the polyether and of the COOH ends of the polyamide begins with formation of ester bonds and removal of water. As much water as possible is removed from the reaction medium by distillation, and the catalyst is then introduced to complete the linking of the polyamide blocks and polyether blocks. This second step is carried out with stirring, preferably under a vacuum of at least 5 mm Hg (650 Pa) at a temperature such that the reagents and the copolymers obtained are in molten form. By way of example, this temperature can be between 100 and 400° C. and usually between 200 and 300° C. The reaction is followed by measuring the torsional couple exerted by the molten polymer on the stirrer or by measuring the electrical power consumed by the stirrer. The end of the reaction is determined by the value of the couple or of the target power. The catalyst is defined as being any product which facilitates the linking of the polyamide blocks and polyether blocks by esterification. The catalyst is advantageously a derivative of a metal (M) chosen from the group formed by titanium, zirconium and hafnium.

Examples of derivatives which may be mentioned are tetraalkoxides corresponding to the general formula M(OR)$_4$, in which M represents titanium, zirconium or hafnium and the radicals R, which may be identical or different, denote linear or branched alkyl radicals containing from 1 to 24 carbon atoms.

The $C_1$ to $C_{24}$ alkyl radicals, from which the radicals R in the tetraalkoxides used as catalysts in the process according to the invention are, for example, alkyl radicals such as methyl, ethyl, propyl, isopropyl, butyl, ethylhexyl, decyl, dodecyl or hexadodecyl. The preferred catalysts are the tetraalkoxides for which the radicals R, which may be identical or different, are $C_1$ to $C_8$ alkyl radicals. Examples of such catalysts are, in particular, $Z_r(OC_2H_5)_4$, $Z_r(O\text{-}isoC_3H_7)_4$, $Z_r(OC_4H_9)_4$, $Zr(OC_5H_{11})_4$, $Z_r(OC_6H_{13})_4$, $H_f(OC_2H_5)_4$, $H_f(OC_4H_9)_4$ and $H_f(O\text{-}isOC_3H_7)_4$.

The catalyst used in this process according to the invention can consist solely of one or more of the tetraalkoxides of formula M(OR)$_4$ defined above. It can also be formed by the combination of one or more of these tetraalkoxides with one or more alkali metal alkoxides or alkaline-earth metal alkoxides of formula $(R_1O)_pY$ in which $R_1$ denotes a hydrocarbon-based residue, advantageously a $C_1$ to $C_{24}$, and preferably $C_1$ to $C_8$, alkyl residue, Y represents an alkali metal or alkaline-earth metal and p is the valency of Y. The amounts of alkali metal or alkaline-earth metal alkoxide and of zirconium or hafnium tetraalkoxides which are combined to constitute the mixed catalyst can vary within a wide range. However, it is preferred to use amounts of alkoxide and of tetraalkoxides such that the molar proportion of alkoxide is substantially equal to the molar proportion of tetraalkoxide.

The weight proportion of catalyst, i.e. of the tetraalkoxide(s) when the catalyst contains no alkali metal or alkaline-earth metal alkoxide, or alternatively of all of the tetraalkoxide(s) and of the alkali metal or alkaline-earth metal alkoxide(s) when the catalyst is formed by a combination of these two types of compounds, advantageously ranges from 0.01 to 5% relative to the weight of the mixture of the dicarboxylic polyamide with the polyoxyalkylene glycol, and is preferably between 0.05 and 2% relative to this weight.

Examples of other derivatives which may also be mentioned are salts of the metal (M), in particular salts of (M) and of an organic acid, and complex salts between the oxide of (M) and/or the hydroxide of (M) and an organic acid. The organic acid may advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts can be referred to as zirconyl salts. Without being bound by this explanation, the Applicant believes that these salts of zirconium and of an organic acid or the complex salts mentioned above release ZrO++ during the process. The product sold under the name zirconyl acetate is used. The amount to be used is the same as for the derivatives $M(OR)_4$.

This process and these catalysts are described in patents U.S. Pat. No. 4,332,920, U.S. Pat. No. 4,230,838, U.S. Pat. No. 4,331,786, U.S. Pat. No. 4,252,920, JP 07 145 368 A, JP 06 287 547 A and EP 613 919.

As regards the one-step process, all the reagents used in the two-step process, i.e. the polyamide precursors, the chain-limiting dicarboxylic acid, the polyether and the catalyst, are mixed together. These are the same reagents and the same catalyst as in the two-step process described above. If the precursors are only lactams, it is advantageous to add a small amount of water.

The copolymer has essentially the same polyether blocks and the same polyamide blocks, but also a small proportion of different reagents which have reacted randomly and which are distributed randomly along the polymer chain.

The reactor is closed and heated with stirring as in the first step of the two-step process described above. The pressure is established at between 5 and 30 bar. When it no longer changes, the reactor is placed under reduced pressure while maintaining vigorous stirring of the molten reagents. The reaction is continued as previously for the two-step process.

The catalyst used in the one-step process is preferably a salt of the metal (M) and of an organic acid or a complex salt between the oxide of (M) and/or the hydroxide of (M) and an organic acid.

As regards the copolymers (C1), the unsaturated carboxylic anhydride may be chosen, for example, from maleic anhydride, itaconic anhydride, citraconic anhydride, allylsuccinic anhydride, cyclohex-4-ene-1,2-dicarboxylic anhydride, 4-methylenecyclohex-4-ene-1,2-dicarboxylic anhydride, bicyclo(2,2,1)hept-5-ene-2,3-dicarboxylic anhydride and x-methylbicyclo-(2,2,1 )hept-5-ene-2,2-dicarboxylic anhydride. Maleic anhydride is advantageously used. The number-average molar mass is between 800 and 10,000 and preferably between 1000 and 3500. (C1) can be represented by the following formula:

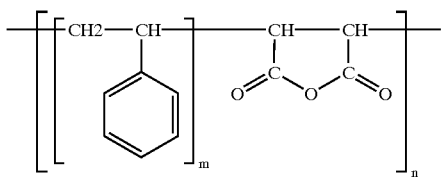

in which MAH denotes maleic anhydride, m ranges from 1 to 3 and n ranges from 6 to 8. These copolymers may be partially esterified, to between 35 and 75%, with alcohols. These products are sold under the name SMA® Resins by the company ELF ATOCHEM.

As regards the copolymers (C2), they may be polyethylenes grafted with an unsaturated carboxylic anhydride or copolymers of ethylene and of an unsaturated carboxylic anhydride which is obtained, for example, by radical-mediated polymerization.

As regards the polyethylenes onto which the unsaturated carboxylic anhydride is grafted, the term "polyethylene" means homopolymers or copolymers.

Comonomers which may be mentioned include:
α-olefins, advantageously those containing from 3 to 30 carbon atoms; examples of α-olefins which may be mentioned are propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1 -octadecene, 1-eicosene, 1-docosene, 1 -tetracosene, 1-hexacosene, 1-octacosene and 1-triacontene; these α-olefins can be used alone or as a mixture of two or more than two, unsaturated carboxylic acid esters such as, for example, alkyl (meth)acrylates, the alkyls possibly containing up to 24 carbon atoms; examples of alkyl acrylates or methacrylates are, in particular, methyl methacrylate, ethyl acrylate, n-butyl acrylate, isobutyl acrylate, 2-ethylhexyl acrylate and n-octyl acrylate, vinyl esters of saturated carboxylic acids such as, for example, vinyl acetate or vinyl propionate, dienes such as, for example, 1,4-hexadiene.

The polyethylene can comprise several comonomers.

Advantageously, the polyethylene, which may be a mixture of several polymers, comprises at least 50% and preferably 75% (on a molar basis) of ethylene, and its density can be between 0.86 g/cm³ and 0.98 g/cm³. The MFI (viscosity index at 190° C., 2.16 kg) is advantageously between 1 g/10 min and 1000 g/10 min.

Examples of polyethylenes which may be mentioned are:
low density polyethylene (LDPE)
high density polyethylene (HDPE)
linear low density polyethylene (LLDPE)
very low density polyethylene (VLDPE)
the polyethylene obtained by metallocene catalysis, i.e. the polymers obtained by copolymerization of ethylene and of an α-olefin such as propylene, butene, hexene or octene, in the presence of a single-site catalyst generally consisting of a zirconium or titanium atom and of two cyclic alkyl molecules linked to the metal. More specifically, the metallocene catalysts are usually compounds of two cylcopentadiene rings linked to the metal. These catalysts are frequently used with aluminoxanes as co-catalysts or activators, preferably methylaluminoxane (MAO). Hafnium can also be used as the metal to which the cyclopentadiene is attached. Other metallocenes can include transition metals from groups IV A, V A, et VI A. Metals from the lanthanide series can also be used.
EPR (ethylene-propylene-rubber) elastomers
EPDM (ethylene-propylene-diene) elastomers
mixtures of polyethylene with an EPR or an EPDM
ethylene-alkyl (meth)acrylate copolymers possibly containing up to 60% by weight of (meth)acrylate and preferably 2% to 40%.

Grafting is an operation which is known per se.

As regards the copolymers of ethylene and of the unsaturated arboxylic anhydride, i.e. those in which the unsaturated carboxylic anhydride is to grafted, this concerns copolymers of ethylene, of the unsaturated carboxylic anhydride and optionally of another monomer which may be chosen from the comonomers mentioned above for the ethylene copolymers which are intended to be grafted.

Ethylene-maleic anhydride and ethylene-alkyl (meth) acrylate—maleic anhydride copolymers are advantageously used. These copolymers comprise from 0.2% to 10% by weight of maleic anhydride and from 0 to 40% by weight of alkyl (meth)acrylate. Their MFI is between 1 and 50 (190° C.–216 kg). The alkyl (meth)acrylates have already been described previously.

It would not constitute a departure from the context of the invention to replace in (C2) the unsaturated carboxylic anhydride with an unsaturated carboxylic acid such as (meth)acrylic acid, this function possibly being partially neutralized with a metal (Zn, K) or an alkali metal (Li), in which case they are ionomers. Ionomers of this type are sold by the company Dupont under the brand name Surlyn®.

As regards the copolymers (C3), the copolymer of ethylene and of an unsaturated epoxide can be obtained by copolymerization of ethylene and of an unsaturated epoxide or by grafting the unsaturated epoxide onto the polyethylene. The grafting can be carried out in a solvent phase or on the molten polyethylene in the presence of a peroxide. These grafting techniques are known per se. As regards the copolymerization of ethylene and of an unsaturated epoxide, radical-mediated polymerization processes usually functioning at pressures of between 200 and 2500 bar can be used.

Examples of unsaturated epoxides which may be mentioned are:

aliphatic glycidyl esters and ethers such as allyl glycidyl ether, vinyl glycidyl ether, glycidyl maleate, glycidyl itaconate and glycidyl (meth)acrylate, and alicyclic glycidyl esters and ethers, such as 2-cyclohexene-1-glycidyl ether, cyclohexene-4,5-diglycidyl carboxylate, cyclohexene4-glycidyl carboxylate, 5-norbornene-2-methyl-2-glycidyl carboxylate and endocis-bicyclo(2,2,1)-5-heptene-2,3-diglycidyl dicarboxylate.

As regards the grafting, the copolymer (C3) is obtained from the grafting of a polyethylene homopolymer or copolymer as described for (C2), except that an epoxide is grafted instead of an anhydride. As regards a copolymerization, this is also similar to (C2) except that an epoxide is used; there may also be other comonomers therein, as in the case of (C2).

The copolymer (C3) is advantageously an ethylene/alkyl (meth)acrylate/unsaturated epoxide copolymer. Advantageously, it may contain up to 40% by weight of alkyl (meth)acrylate and up to 10% by weight of unsaturated epoxide, preferably 0.1% to 8%.

The epoxide is advantageously glycidyl (meth)acrylate.

The alkyl (meth)acrylate is advantageously chosen from methyl (meth)acrylate, ethyl acrylate, n-butyl acrylate, isobutyl acrylate and 2-ethylhexyl acrylate. The amount of alkyl (meth)acrylate is advantageously from 20% to 35%. The MFI is advantageously between 1 and 50 (in g/10 min at 190° C. under 2.16 kg). This copolymer can be obtained by radical-mediated polymerization of the monomers.

If the initial composition contains (A) and an acrylic impact modifier, then it suffices to add (B), and if the initial composition contains only (A), then it is necessary to add one of the copolymers (C1) to (C3) in addition to (B). The amount of (C1), (C2) or (C3) is advantageously such that (B)/(C) by weight is between 2 and 10 and preferably between 4 and 6. A mixture of two of these copolymers or all three of them can be used. As regards the proportions in the (B)/(C) ratio, (C) represents the sum of the amounts of (C1) and (C3) used. It would not constitute a departure from the context of the invention to add, to a composition already containing (A) and an acrylic impact modifier, not only (B) but also at least one of the copolymers (C1) to (C3). It would not constitute a departure from the context of the invention to add, to a composition containing (A) and no impact modifier, not only (B) and one of the copolymers (C1) to (C3), but also an acrylic impact modifier.

The antistatic nature increases with the proportion of (B) and, for equal amounts of (B), with the proportion of ethylene oxide-units contained in (B).

As regards compositions in which (C) is an acrylic impact modifier, 8 to 15 parts of (B) are advantageously used per 92 to 85 parts of (A)+(C), and preferably 8 to 11 parts of (B) per 92 to 89 parts of (A)+(C). The invention is particularly useful for PMMA impact-modified with an acrylic impact modifier.

It would not constitute a departure from the context of the invention to add mineral fillers (talc, $CaCO_3$, kaolin, etc.), reinforcing agents (glass fibre, mineral fibre, carbon fibre, etc.), stabilizers (heat stabilizers or UV stabilizers), flame retardants and dyes, provided that this does not concern the transparent polymer (A).

The compositions of the invention are prepared by the usual techniques for thermoplastics, such as, for example, by extrusion or with the aid of twin-screw mixers or alternatively using apparatus such as a Buss® Ko-blender. However, the Applicant has found that, when (B) is added to (A) already containing an acrylic impact modifier, then it is not necessary to produce an intimate mixture in an extruder or mixer, to recover the compositions in the form of granules or in molten form and then to introduce them into a moulding or extrusion device; specifically, it suffices to produce a mixture of (A) containing the acrylic impact modifier and of (B) in dry form as powder or granules (dry blend) and then to introduce this mixture into the moulding or injection device.

The present invention also relates to the objects manufactured with the above compositions; these are, for example, films, tubes, plates, wrappings, and computer or telephone housings.

EXAMPLES

The following ingredients were used:

for the PMMAs, the MFI expressed on a volume basis is used (the density of the PMMA is 1.18 g/cm$^3$).

OROGLAS® V 825T: PMMA containing no acrylic impact modifier, characterized by an MFI=2.8 cm$^3$/10 min (230° C., 3.8 kg) and a Charpy impact strength at +23° C. of 20 kJ/m$^2$.

OROGLAS® MI 4T: PMMA containing no acrylic impact modifier, characterized by an MFI=2.8 cm$^3$/10 min (230° C., 3.8 kg) and a Charpy impact strength at +23° C. of 35 kJ/m$^2$.

OROGLASE HF 17: PMMA containing no acrylic impact modifier, characterized by an MFI=10.3 cm$^3$/10 min (230° C., 3.8 kg) and a Charpy impact strength at +23° C. of 45 kJ/m$^2$.

PEBAX® MV 1074SN01: this is a copolyether-block-amide containing nylon-12 blocks with a number-average molar mass of 1500 and PEG blocks with a number-average molar mass of 1500; the MFI is 14 at 235° C./1 kg and the melting point is 158° C.

PEBAX® MH 1657: this is a copolyether-block-amide containing nylon-6 blocks with a number-average molar mass of 1500 and PEG blocks with a number-average molar mass of 1500; the MFI is 14 at 235° C./1 kg and the melting point is 204° C.

In the examples which follow, the following characterization techniques were used:

mechanical and antistatic properties:

The compositions are prepared and injected directly onto a press at temperatures of 210 to 240° C. in the form of plaques 100 mm×100 mm×2 mm in size. These plaques make it possible to carry out the resistivity measurements according to the standard IEC-93 and the multiaxial impact measurements.

In Table 1, the surface resistivity Rs is measured in ohms. All the tests are carried out at 23° C. The plaques are conditioned under 50% humidity for 15 days before being tested to measure the surface resistivity.

Example 4 is comparative; the resistivity is decreased by a factor of only 100 and the impact strength is little changed. In Examples 5 and 6, the resistivity is decreased by a factor of 3000 and 10,000, respectively, and the impact strength is greatly improved.

TABLE 1

| Examples | 1 | 2 | 3 | 4 | 5 | 6 | 7 | 8 | 9 |
|---|---|---|---|---|---|---|---|---|---|
| Oroglas V825T | 100 | | | 90 | | | 90 | | |
| Oroglas MI4T | | 100 | | | 90 | | | 90 | |
| Oroglas HFI7 | | | 100 | | | 90 | | | 90 |
| MV1074SN01 | | | | 10 | 10 | 10 | | | |
| MH1657 | | | | | | | 10 | 10 | 10 |
| Rs Ω/□ | 2.40E+16 | 6.10E+16 | 4.70E+16 | 2.60E+14 | 2.10E+13 | 3.60E+12 | 6.70E+13 | 1.00E+13 | 1.70E+11 |
| F max (N), V = 1 m/s | 273 | 304 | 839 | 271 | 468 | 2075 | | | 2314 |
| E F max (J), V = 1 m/s | 0.15 | 0.15 | 1.22 | 0.13 | 0.39 | 5.25 | | | 6.9 |
| E total (J), V = 1 m/s | 0.8 | 1.12 | 2.19 | 1.28 | 1.37 | 5.27 | | | 7.9 |
| F maximum (N), V = 0.001 m/s | | | 1593 | 345 | 4705 | 4207 | | | |
| E F max (J), V = 0.001 m/s | | | 3.57 | 0.21 | 45.13 | 41.76 | | | |

The optical properties are given in Table 2 below:

TABLE 2

| Composition | | Transmission % | | |
|---|---|---|---|---|
| | | 460 nm | 560 nm | 700 nm |
| V825T | EX 1 | 93 | 93.5 | 94 |
| 90/10 V825T/PEBAX MV1074 | EX 4 | 85 | 89 | 92 |
| MI4T | EX 2 | 90 | 93 | 93.3 |
| 90/10 MI4T/PEBAX MV1074 | EX 5 | 83 | 88 | 91 |
| HFI7 | EX 3 | 91 | 92 | 93 |
| 90/10 HFI7/PEBAX MV1074 | EX 6 | 77 | 83 | 88 |

We claim:

1. Antistatic composition having improved impact strength behaviour, comprising, per 100 parts by weight:

95 to 80 parts of (A)+(C), 5 to 20 parts of (B), (A) being polymethyl methacrylate, (B) being a copolymer containing polyamide blocks and polyether blocks comprising ethylene oxide —($C_2H_4$—O)— units, (C) comprising both an acrylic impact modifier and at least one of
a copolymer (C1) of styrene and of an unsturated carboxylic anhydride, a copolymer (C2) of ethylene and of an unsaturated carboxylic anhydride, and a copolymer (C3) of ethylene and of an unsatyrated epoxide wherein the acrylic impact modifier is a copolymer of at least one monomer chosen from styrene, butadiene and isoprene and of at least one monomer chosen from acrylinitrile and alkyl (meth)acrylate.

2. A composition according to claim 1, wherein the copolymer (C1) comprises styrene and maleic anhydride, with an average molar mass of between 800 and 10,000.

3. A composition according to claim 1, wherein the copolymer (C2) is an ethylene-alkyl (meth)acrylate-maleic anhydride copolymer, comprising from 0.2% to 10% by weight of maleic anhydride and up to 40% by weight of alkyl (metheacrate.

4. A composition according to claim 1, wherein the copolymer(C3) is an ethylene/alkyl (meth)acrylate/unsaturated epoxide copolymer containing not more than 40% by weight of alkyl (meth)acrylate and not more than 10% by weight of unsaturated epoxide.

5. A composition according to claim 1, comprising 8 to 15 parts of (B) per 92 to 85 parts of (A)+(C).

6. A composition according to claim 1, comprising 8 to 11 parts of (B) per 92 to 89 parts of (A)+(C).

7. An article of manufacture produced from a composition according to claim 1.

8. A method of improving the multiaxial impact behavior of an acrylic resin, comprising:

mixing an acrylic polymer (A) with an acrylic impact modifier; and dry blending the acrylic impact modifier-acrylic polymer (A) mixture with a copolymer (B) containing polyarnide blocks and polyether blocks comprising ethylene oxide —($C_2H_4$—O)— units and at least one of a copolymer (C1) of styrene and of an unsaturated carboxylic anhydride, a copolymer (C2) of ethylene and of an unsaturated carboxylic anhydride, or a copolymer (C3) of ethylene and of an unsaturated epoxide.

9. The method according to claim 8, wherein the acrylic polymer (A) is polymethyl methacrylate, and the acrylic impact modifier is a copolymer of at least one monomer chosen from styrene, butadiene and isoprene and of at least one monomer chosen from acrylonitrile and alkyl (meth)acrylate.

10. A method of improving the multiaxial impact behavior of an acrylic resin, comprising:

polymerizing an acrylic polymer (A) with an acrylic impact modifier; and dry blending the acrylic impact modifier-acrylic polymer (A) mixture with a copolymer containing polyamide blocks and polyether blocks comprising ethylene oxide —($C_2H_4$—O)— units.

11. The method according to claim 10, wherein the acrylic polymer (A) is polymethyl methacrylate, and the acrylic impact modifier is a copolymer of at least one monomer chosen from styrene, butadiene and isoprene and of at least one monomer chosen from acrylonitrile and alkyl (meth) acrylate.

12. The method according to claim 11, further comprising blending at least one of a copolymer (C1) of styrene and of an unsaturated carboxylic anhydride, a copolymer (C2) of ethylene and of an unsaturated carboxylic anhydride, or a copolymer (C3) of ethylene and of an unsaturated epoxide.

* * * * *

UNITED STATES PATENT AND TRADEMARK OFFICE
CERTIFICATE OF CORRECTION

PATENT NO. : 6,525,134 B1
DATED : February 25, 2003
INVENTOR(S) : Christophe Lacroix et al.

It is certified that error appears in the above-identified patent and that said Letters Patent is hereby corrected as shown below:

<u>Column 11,</u>
Line 49, reads "unsturated" should read -- unsaturated --
Line 52, reads "unsatyrated" should read -- unsaturated --
Line 56, reads "acrylinitrile" should read -- acrylonitrile --.
Line 64, reads "(metheacrate." should read -- (meth)acrylate. --

<u>Column 12,</u>
Lines 35-36, reads "polyarnide blocks" should read -- polyamide blocks --

Signed and Sealed this

First Day of June, 2004

JON W. DUDAS
*Acting Director of the United States Patent and Trademark Office*